US008499313B2

(12) United States Patent
Tang et al.

(10) Patent No.: US 8,499,313 B2
(45) Date of Patent: Jul. 30, 2013

(54) OPTICAL DISC DRIVE

(75) Inventors: Xue-Dong Tang, Shenzhen (CN); Wei Liu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 353 days.

(21) Appl. No.: 12/907,991

(22) Filed: Oct. 20, 2010

(65) Prior Publication Data
US 2011/0154380 A1 Jun. 23, 2011

(30) Foreign Application Priority Data
Dec. 22, 2009 (CN) .......................... 2009 1 0312010

(51) Int. Cl.
*G11B 17/03* (2006.01)
(52) U.S. Cl.
USPC ........................................ 720/613

(58) Field of Classification Search
USPC .......................................... 720/613, 607, 610
See application file for complete search history.

(56) References Cited

U.S. PATENT DOCUMENTS
5,617,395 A * 4/1997 Choi .............................. 720/613
* cited by examiner

*Primary Examiner* — David D Davis
(74) *Attorney, Agent, or Firm* — Altis Law Group, Inc.

(57) ABSTRACT

An optical disc drive includes a housing with a protrusion and a tray capable of sliding in and out of the housing. The tray includes a first surface, and a second surface opposite to the first surface. The first surface is partially recessed to form a receiving space for accommodating an optical disc. The second surface defines a channel, and forms a blocking portion at one end of the channel. The protrusion slides in the channel to guide the tray to slide in and out of the housing, and cooperates with the channel to prevent the tray from vibrating. When the tray is fully extended from the housing, the protrusion is located at the end of the channel forming the blocking portion, thus the protrusion is blocked by the blocking portion from sliding too far so that the tray is prevented from sliding off the housing.

13 Claims, 5 Drawing Sheets

OPTICAL DISC DRIVE

BACKGROUND

1. Technical Field

The present disclosure relates to optical disc drives, and particularly to an optical disc drive with a housing, and a tray capable of sliding in and out of the housing smoothly.

2. Description of Related Art

An optical disc drive often includes a housing and a tray received in the housing. The tray is used for holding the optical disc and for inserting and ejecting the optical disc in and out of the housing. However, the tray often vibrates during operation and may become loose and so cannot slide in and out of the housing smoothly.

Therefore, there is room for improvement in the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
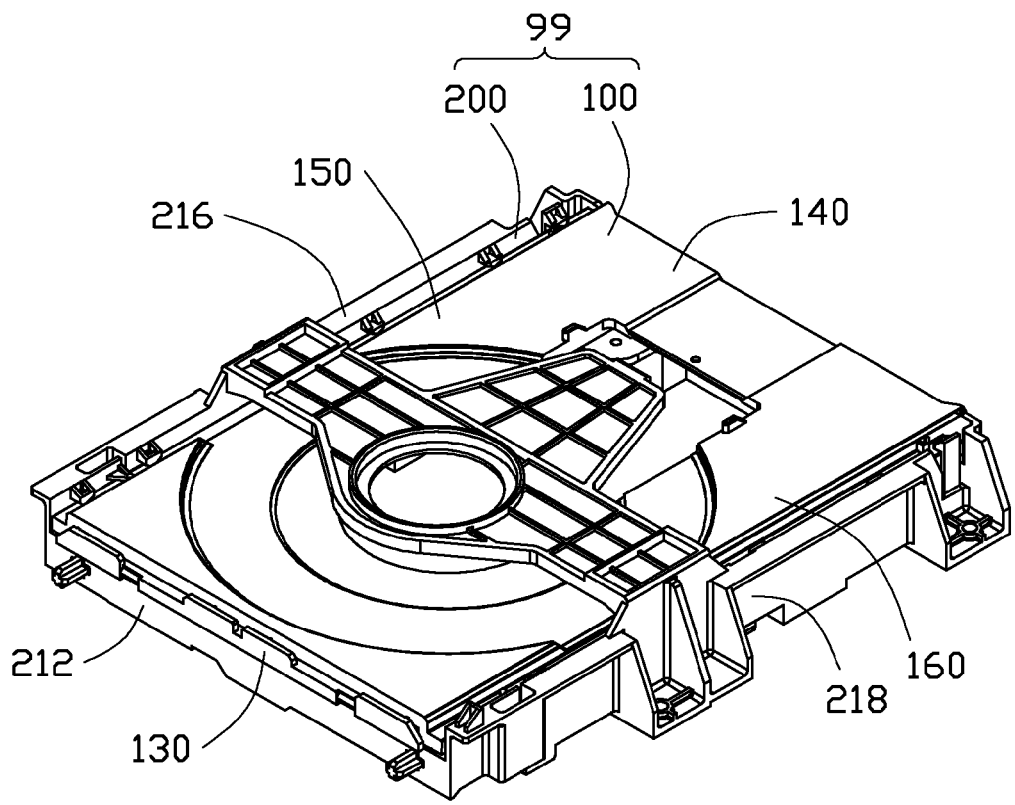
FIG. 1 is a perspective view of an optical disc drive in one state in accordance with an exemplary embodiment.
Figure 2:
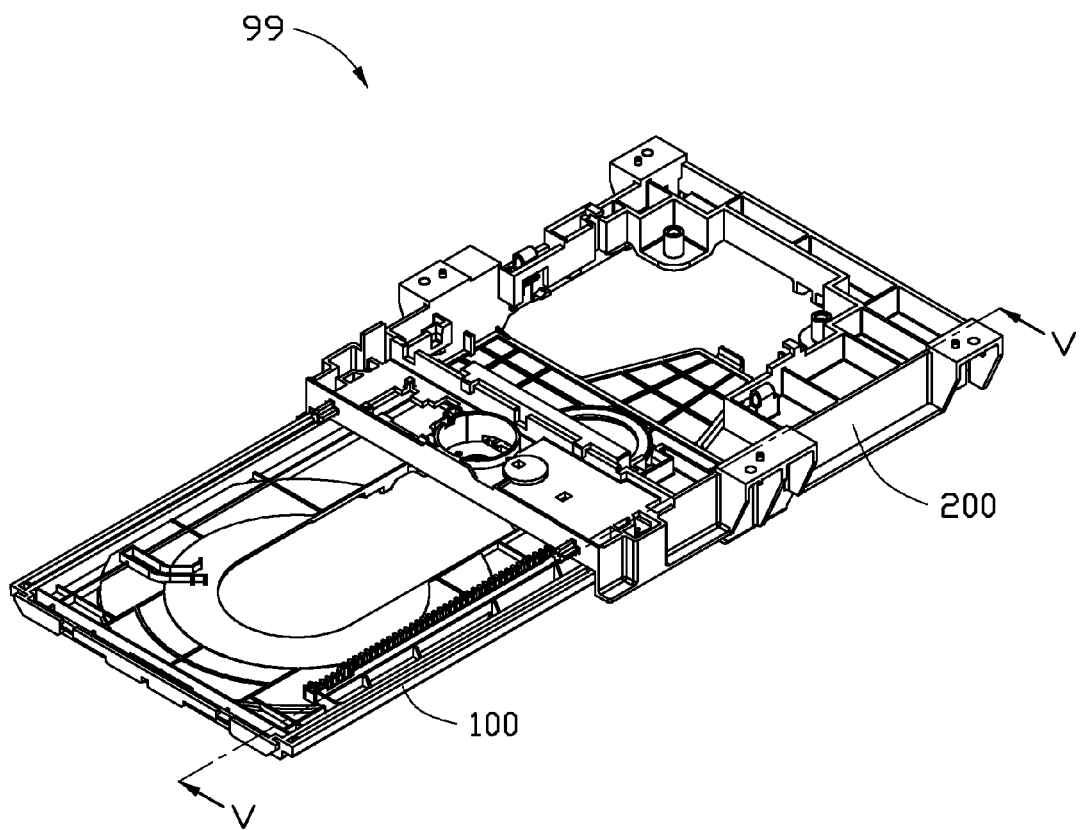
FIG. 2 is a perspective view of the optical disc drive in FIG. 1 in another state.

Referring to FIGS. 1 and 2, an optical disc drive 99 includes a housing 200 and a tray 100 received in the housing 200. The tray 100 is capable of sliding in out of the housing 200 while carrying an optical disc.

Figure 3:
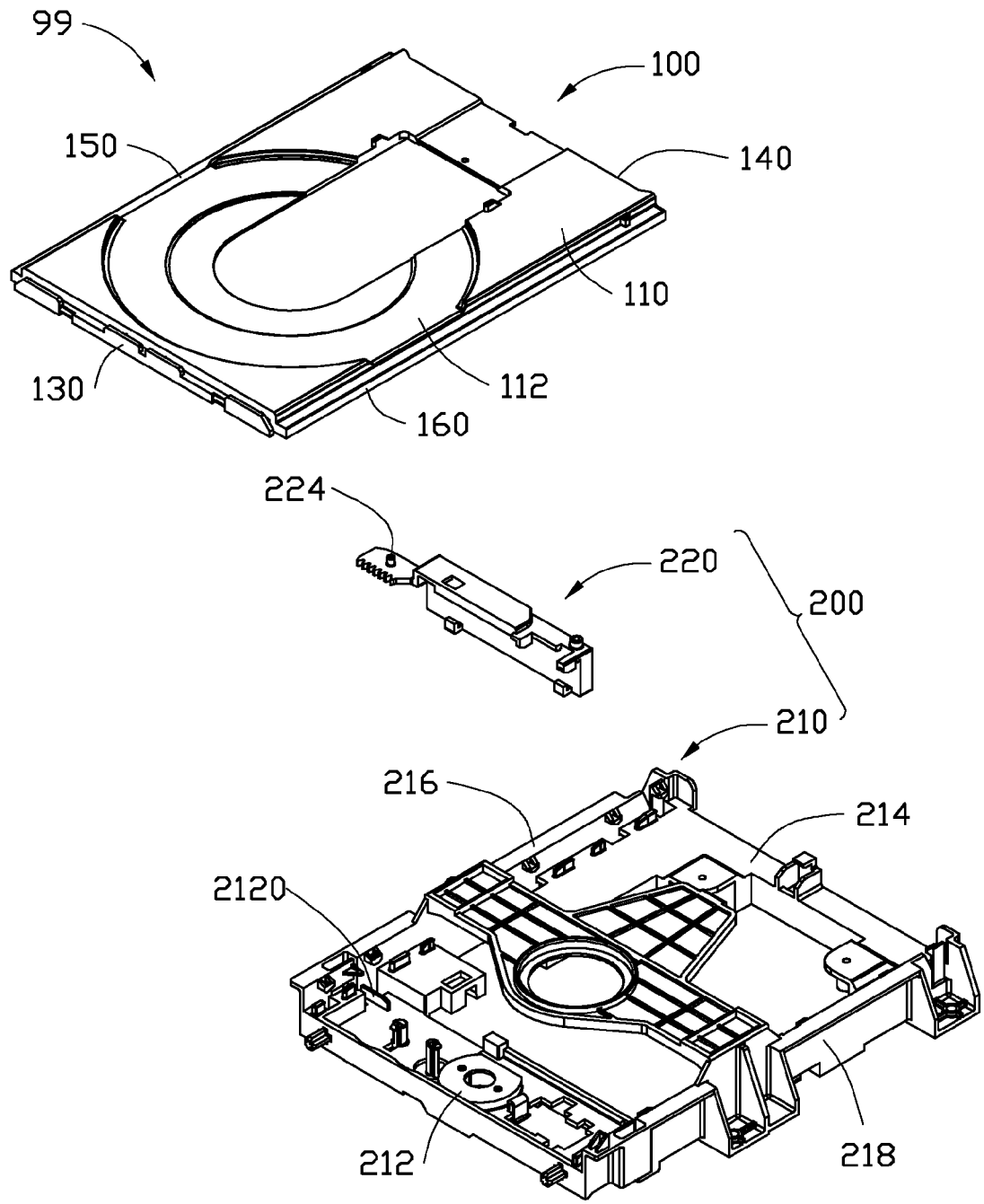
FIG. 3 is an exploded view of the optical disc drive of FIG. 1 from one direction.

Referring to FIG. 3, the tray 100 includes a first surface 110, a second surface 120 (referring to FIG. 4) opposite to the first surface 110, a front flange 130, a back flange 140 parallel to the front flange 130, a left flange 150, and a right flange 160 parallel to the left flange 150. The first flange 130, the left flange 150, the back flange 140, and the right flange 160 are perpendicularly interconnected in turn. A portion of the first surface 110 adjacent to the front flange 130 is recessed to form a circular receiving space 112 for receiving an optical disc.

Figure 4:
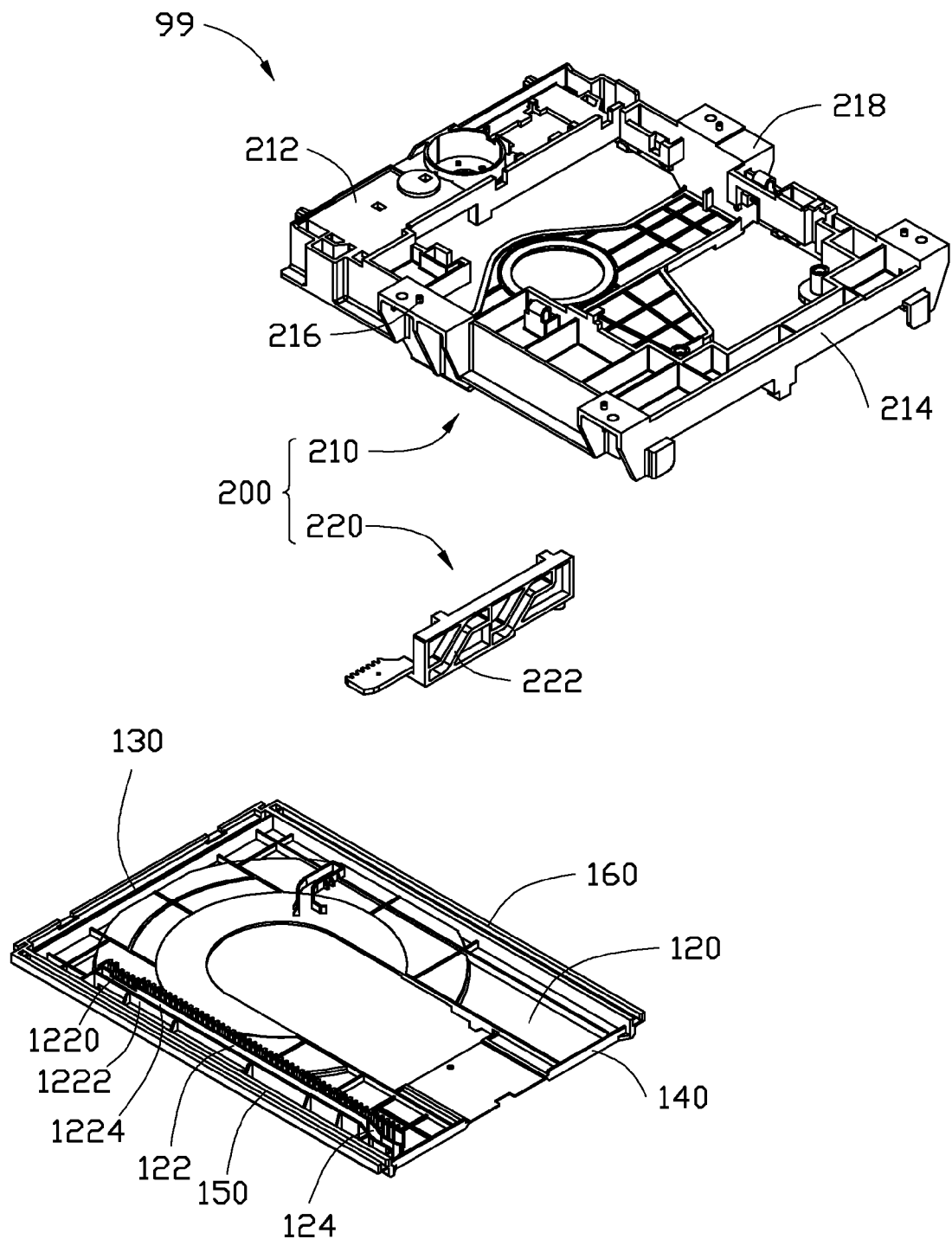
FIG. 4 is similar to FIG. 3, but from an opposite direction.

Referring to FIG. 4, the second surface 120 defines a channel 122 parallel and adjacent to the left flange 150, and a blocking portion 124 is formed at the end of the channel 122 adjacent to the back flange 140. The channel 122 is formed by a first bar 1222 and a second bar 1224 parallel to the left flange 150. The first bar 1222 is located between the left flange 150 and the second bar 1224. The second bar 1224 defines a rectangular opening 1220 at the end thereof adjacent to the front flange 130. In this embodiment, the blocking portion 124 is formed by angling the first and second bars 1222, 1224 towards the left flange 150. The blocking portion 124 bounds a slit communicating with the channel 122, and the slit is nonlinearly arranged with the channel 122.

Referring to FIG. 3 again, the housing 200 includes a bearing frame 210 and a sliding frame 220 arranged on the bearing frame 210. The bearing frame 210 includes a front beam 212, a back beam 214 parallel to the front beam 212, a left beam 216, and a right beam 218 parallel to the left beam 216. The front beam 212, the left beam 216, the bake beam 214, and the right beam 218 are perpendicularly interconnected in turn to form the bearing frame 210. The front beam 212 forms a supporting portion 2120 at the side of the left beam 216.

The sliding frame 220 is substantially bar shaped, and arranged on the inner side of the front beam 212. The sliding frame 220 defines a sliding slot 222 (referring to FIG. 4) at the right end, and a cylindrical protrusion 224 at the left end sized to fit in the channel 122 in such a way that it can smoothly and easily slide in the channel 122 but with little space leftover so that the protrusion 224 can slides without vibration. The left end of the sliding frame 220 is located above the supporting portion 212, and can be supported by the supporting portion 212.

Referring to FIG. 1 again, in assembly, the tray 100 is received in the housing 200. The front flange 130 and the back flange 140 of the tray 100 are parallel and aligned with the front beam 212 and the back beam 214 respectively. The left flange 150 and the right flange 160 are respectively slidingly received in the left beam 216 and the right beam 218 of the bearing frame 210, thus the tray 100 can slide in and out of the housing 200. The protrusion 224 is inserted into the channel 122, and can slide in the channel 122.

Figure 5:
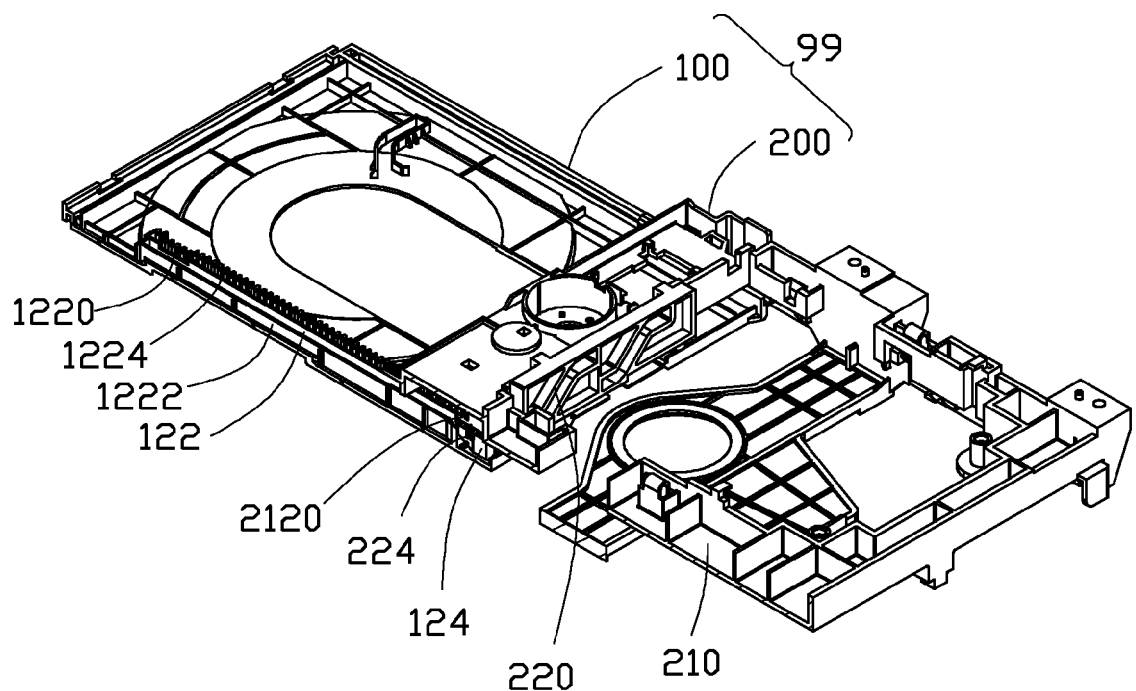
FIG. 5 is a cross-sectional view of the optical disc drive in FIG. 2 along the line V-V.

Referring to FIG. 5, when the tray 100 slides in or out of the housing 200, the protrusion 224 slides in the channel 122 of the tray 100 to guide the tray 100, and cooperates with the channel 122 to prevent the tray 100 from vibrating. The left end of the sliding frame 220 is supported by the supporting portion 2120 to prevent the sliding frame 220 from falling downward.

When the tray 100 is fully extended from the housing 200, the protrusion 224 is located at the end of the channel 122 forming blocking portion 124, thus the protrusion 224 is blocked by the blocking portion 124 from sliding too far so that the tray 100 is prevented from sliding off the housing 200.

When the tray 100 is fully slid in the housing 200, the protrusion 224 is located near the opening 1220 of the second bar 1224 of the channel 122, and capable of moving in and out of the channel 122 through the opening 1220, thus the sliding frame 220 can move left and right with respect to the front beam 212 of the bearing frame 210.

In other embodiments, the blocking portion 124 may be a protrusion or end wall formed to perform the same function of blocking a protrusion 224 received in the channel 122 from escaping out the end of the channel 122.

It is to be understood, however, that even though information and advantages of the present embodiments have been set forth in the foregoing description, together with details of the structures and functions of the present embodiments, the disclosure is illustrative only; and that changes may be made in detail, especially in matters of shape, size, and arrangement of parts within the principles of the present embodiments to the full extent indicated by the broad general meaning of the terms in which the appended claims are expressed.

What is claimed is:

1. An optical disc drive, comprising:

a housing comprising a bearing frame and a sliding frame arranged on the bearing frame; the bearing frame comprising a front beam, a back beam parallel to the front beam, a left beam, and a right beam parallel to the left beam; the front beam, the left beam, the back beam, and the right beam interconnected in turn to form the bearing frame; the sliding frame arranged on the inner side of the front beam; and a tray capable of sliding in and out of the housing, the tray comprising a first surface, a second surface opposite to the first surface, a first flange, a second flange parallel to the first flange, a left flange parallel to the sliding direction of the tray, a right flange parallel to the left flange; the first surface partially recessed to form a receiving space for accommodating an optical disc;

wherein the front beam defines a supporting portion at the side of the left beam, and the supporting portion is adapted to support the left end of the sliding frame to prevent the sliding frame from falling downward when the tray slides in or out of the housing; the second surface defines a channel parallel to the left flange; the channel is formed by a first bar and a second bar parallel to the sliding direction of the tray, the first bar located between the left flange and the second bar, the second bar defining an opening thereof adjacent to the front flange, the opening allows the protrusion to move in and out therethrough, thus the sliding frame moves left and right with respect to the front beam.

2. The optical disc drive according to claim 1, wherein the sliding frame comprising a protrusion at the left end; the protrusion capable of sliding in the channel to guide the tray to slide in and out the housing, and cooperating with the channel to prevent the tray from vibrating.

3. The optical disc drive according to claim 2, wherein the second surface further forms a blocking portion at the end of the channel adjacent to the back flange, when the tray is fully extended from the housing, the protrusion located at the end of the channel forming the blocking portion, thus the protrusion is blocked by the blocking portion from sliding too far so that the tray is prevented from sliding off the housing.

4. The optical disc drive according to claim 3, wherein the blocking portion is formed by angling the first and second bars towards the left flange.

5. The optical disc drive according to claim 4, wherein the blocking portion bounds a slit communicating with the channel, and the slit is nonlinearly arranged with the channel.

6. An optical disc drive, comprising:

a housing comprising a bearing frame and a sliding frame arranged on the bearing frame; the bearing frame comprising a front beam, a back beam parallel to the front beam, a left beam, and a right beam parallel to the left beam; the front beam, the left beam, the back beam, and the right beam interconnected to form the bearing frame; the sliding frame arranged on the inner side of the front beam; and a tray capable of sliding in and out of the housing, the tray comprising a first surface, a second surface opposite to the first surface, a first flange, a second flange parallel to the first flange, a left flange, a right flange parallel to the left flange; the first surface partially recessed to form a receiving space for accommodating an optical disc;

wherein the second surface defines a channel parallel to the left flange and a blocking portion formed at the end of the channel adjacent to the back flange; the sliding frame comprising a protrusion at the left end; the protrusion sliding in the channel to guide the tray to slide in and out the housing, and cooperating with the channel to prevent the tray from vibrating; when the tray is fully extended from the housing, the protrusion located at the end of the channel forming the blocking portion, thus the protrusion is blocked by the blocking portion from sliding too far so that the tray is prevented from sliding off the housing;

wherein the channel is formed by a first bar and a second bar parallel to the left flange, the first bar located between the left flange and the second bar, the second bar defining an opening thereof adjacent to the front flange, the opening allows the protrusion to move in and out therethrough, thus the sliding frame moves left and right with respect to the front beam.

7. The optical disc drive according to claim 6, wherein the blocking portion is formed by angling the first and second bars towards the left flange.

8. The optical disc drive according to claim 6, wherein the blocking portion bounds a slit communicating with the channel, and the slit is nonlinearly arranged with the channel.

9. The optical disc drive according to claim 6, wherein the front beam defines a supporting portion at the side of the left beam, and the supporting portion is adapted to support the left end of the sliding frame to prevent the sliding frame from falling downward when the tray slide in or out of the housing.

10. An optical disc drive, comprising:

a housing with a protrusion; and a tray capable of sliding in and out of the housing; the tray comprising a first surface, and a second surface opposite to the first surface, the first surface partially recessed to form a receiving space for accommodating an optical disc, the second surface defining a channel extending parallel to the sliding direction of the tray, and forming a blocking portion at one end of the channel;

wherein the protrusion slides in the channel to guide the tray to slide in and out of the housing, and cooperates with the channel to prevent the tray from vibrating;

wherein when the tray is fully extended from the housing, the protrusion is located at the end of the channel forming the blocking portion, thus the protrusion is blocked by the blocking portion from sliding too far so that the tray is prevented from sliding off the housing;

wherein the channel is formed by a first bar and a second bar parallel to the left flange, the first bar located between the left flange and the second bar, the second bar defining an opening thereof adjacent to the front flange, the opening allows the protrusion to move in and out therethrough, thus the sliding frame moves left and right with respect to the front beam.

11. The optical disc drive according to claim 10, wherein the tray further comprises a first flange, a second flange parallel to the first flange, a left flange, a right flange parallel to the left flange.

12. The optical disc drive according to claim 11, wherein the blocking portion bounds a slit communicating with the channel, and the slit is nonlinearly arranged with the channel.

13. The optical disc drive according to claim 11, wherein the bearing frame comprising a front beam, a back beam parallel to the front beam, a left beam, and a right beam parallel to the left beam; the front beam, the left beam, the back beam, and the right beam interconnected to form the bearing frame; the sliding beam arranged on the inner side of the front beam; the front beam defining a supporting portion at the side of the left beam, and the supporting portion adapted to support the left end of the sliding frame to prevent the sliding frame from falling downward when the tray slide in or out of the housing.

\* \* \* \* \*